(12) United States Patent
Osterbrink et al.

(10) Patent No.: US 10,260,648 B2
(45) Date of Patent: Apr. 16, 2019

(54) ACTUATING DUMP VALVE

(71) Applicant: Technologies Holdings Corp., Houston, TX (US)

(72) Inventors: Brian E. Osterbrink, Madison, WI (US); Robert J. Godfrey, Monona, WI (US); Craig M. Zell, Cottage Grove, WI (US)

(73) Assignee: Technologies Holdings Corp., Houston, TX (US)

( * ) Notice: Subject to any disclaimer, the term of this patent is extended or adjusted under 35 U.S.C. 154(b) by 176 days.

(21) Appl. No.: 15/141,034

(22) Filed: Apr. 28, 2016

(65) Prior Publication Data

US 2017/0314689 A1    Nov. 2, 2017

(51) Int. Cl.
| *F16K 11/07* | (2006.01) |
| *A01J 5/04* | (2006.01) |
| *A01J 7/02* | (2006.01) |

(52) U.S. Cl.
CPC ............. *F16K 11/0716* (2013.01); *A01J 5/04* (2013.01); *A01J 7/02* (2013.01); *Y10T 137/0424* (2015.04)

(58) Field of Classification Search
CPC ..... Y10T 137/86702; Y10T 137/86879; Y10T 137/86887; Y10T 137/8663; Y10T 137/86622; Y10T 137/2607; Y10T 137/0402; Y10T 137/0419; Y10T 137/0424; Y10T 137/4336; Y10T 137/4343; F16K 11/0716; A01J 5/04; A01J 7/02; A01J 7/22
USPC ............ 137/625.68, 625.48, 625.49, 625.66, 137/625.65, 116.3, 15.01, 15.04, 15.05, 137/245, 244
See application file for complete search history.

(56) References Cited

U.S. PATENT DOCUMENTS

| 1,501,331 | A | * | 7/1924 | Gulick | ...................... E03D 3/06 |
| | | | | | 137/245 |
| 1,751,061 | A | * | 3/1930 | Ter Beest | .............. F16K 11/065 |
| | | | | | 137/625.29 |

(Continued)

FOREIGN PATENT DOCUMENTS

WO    2009005206 A1    1/2009

OTHER PUBLICATIONS

International Search Report and Written Opinion of the International Searching Authority, International Application No. PCT/US2017/028253, dated Jun. 14, 2017, 13 pages.

*Primary Examiner* — Craig J Price
(74) *Attorney, Agent, or Firm* — Baker Botts L.L.P.

(57) ABSTRACT

An apparatus that includes a housing with an input port and a first output port. A piston is disposed within a bore of the housing and includes a bypass via disposed transversely within the bore and a bypass tube disposed longitudinally within the bore. The bypass tube is configured to provide a flow path from the bypass via to a second output port on the bypass tube. The piston includes a sleeve disposed concentrically around the bypass tube. An interior chamber is defined by an exterior surface of the sleeve and an interior surface of the bore of the housing. The piston is configurable between a first configuration that provides a first flow path between the input port and the first output port via the interior chamber and a second configuration that provides a second flow path between the input port and the second output port via the bypass tube.

18 Claims, 6 Drawing Sheets

(56) References Cited

U.S. PATENT DOCUMENTS

| | | | | |
|---|---|---|---|---|
| 2,471,285 | A | * | 5/1949 | Rice .................... F16K 11/0712 |
| | | | | 137/625.43 |
| 2,631,001 | A | | 3/1953 | Griswold |
| 2,713,344 | A | | 7/1955 | Gallistel |
| 2,982,309 | A | * | 5/1961 | Read ......................... C02F 1/42 |
| | | | | 137/596 |
| 3,010,438 | A | * | 11/1961 | Fife .................... F15B 13/0402 |
| | | | | 137/625.6 |
| 3,559,688 | A | * | 2/1971 | Fischer ............... B60G 17/052 |
| | | | | 137/627.5 |
| 3,840,050 | A | * | 10/1974 | Eggenberger ........... F01D 21/18 |
| | | | | 137/627.5 |
| 3,860,033 | A | * | 1/1975 | Grove .................... F16K 11/065 |
| | | | | 137/557 |
| 6,286,912 | B1 | * | 9/2001 | Sturgess ................ B60T 13/263 |
| | | | | 303/7 |
| 6,997,135 | B1 | | 2/2006 | DeWaard |

* cited by examiner

ACTUATING DUMP VALVE

TECHNICAL FIELD

This disclosure relates generally to valve devices, and more specifically to an actuating valve device.

BACKGROUND

Valve devices used in automated milking systems and robotic milking applications are required to comply with various safety regulations such as preventing fluid contamination. Existing valve devices may be configured to employ multiple valve devices in series to meet such safety requirements. Using multiple valve devices in series may increase the number of parts used, cost, and the overall physical dimensions of the valve system. Using multiple valve devices in series may also increase the complexity of controlling the valve devices, which may prevent the valve devices from safely reverting to a safe state in the event of a system failure. Other valve systems may use backflush valves which are difficult to clean and manufacture. Backflush valves employ a double-acting cylinder and are also unable to safely revert to a safe state in the event of a system failure. It is desirable to provide a valve device that meets safety requirements and is able to transition to a safe state in the event of a system failure.

SUMMARY

In one embodiment, the disclosure includes a system that includes an actuator assembly and a dump valve. The actuator assembly includes a first piston configurable between a first position and a second position. The dump valve is operably coupled to the actuator assembly and includes a second piston and a housing. The housing has an input port and a first output port. The second piston is disposed within a bore of the housing and operably coupled to the first piston. The second piston includes a bypass via disposed transversely within the bore of the housing and a bypass tube disposed longitudinally within the bore of the housing. The bypass tube comprises a second output port and is configured to provide a flow path from the bypass via to the second output port. The second piston further includes a sleeve disposed concentrically around the bypass tube within the bore of the housing. An interior chamber is defined by an exterior surface of the sleeve and an interior surface of the bore of the housing. The second piston is configurable between a first configuration when the first piston is in the first position and a second configuration when the first piston is in the second position. The dump valve is configured to provide a first flow path between the input port and the first output port via the interior chamber when the second piston is configured in the first configuration. The dump valve is configured to provide a second flow path between the input port and the second output port via the bypass tube and the bypass via when the second piston is configured in the second configuration.

In another embodiment, the disclosure includes an apparatus that includes a housing with an input port and a first output port. The apparatus further includes a piston disposed within a bore of the housing. The piston includes a bypass via disposed transversely within the bore of the housing and a bypass tube disposed longitudinally within the bore of the housing. The bypass tube has a second output port and is configured to provide a flow path from the bypass via to the second output port. The piston further includes a sleeve disposed concentrically around the bypass tube within the bore of the housing. An interior chamber is defined by an exterior surface of the sleeve and an interior surface of the bore of the housing. The piston is configurable between a first configuration and a second configuration. The valve is configured to provide a first flow path between the input port and the first output port via the interior chamber when the piston is configured in the first configuration. The valve is configured to provide a second flow path between the input port and the second output port via the bypass via and the bypass tube when the piston is configured in the second configuration.

In yet another embodiment, the disclosure includes a method that includes providing a flow-through flow path between an input port and a first output port via an interior chamber of a valve. The interior chamber is defined by an exterior surface of a sleeve disposed concentrically within a bore of the valve and an interior surface of the bore of the valve. The method further includes actuating the valve to provide a dumping flow path between the input port and a second output port via a bypass tube and a bypass via of a piston disposed within the valve. The bypass via is disposed transversely within the bore of the valve and the bypass tube is disposed longitudinally within the bore of the valve and configured to form the dumping flow path with the bypass via. The valve is configured to obstruct the flow-through flow path when the valve is in the second configuration.

In yet another embodiment, the disclosure includes a method that includes providing a dumping flow path between an input port and a second output port via a bypass via and a bypass tube of a piston disposed within a valve. The bypass via is disposed transversely within the bore of the valve and the bypass tube is disposed longitudinally within the bore of the valve and configured to form the dumping flow path with the bypass via. The method further includes actuating the valve to provide a flow-through flow path between the input port and a first output port via an interior chamber of the valve. The interior chamber is defined by an exterior surface of a sleeve disposed concentrically within the bore of the valve and an interior surface of the bore of the valve. The valve is configured to obstruct the dumping flow path when the valve is in the first configuration.

The present disclosure presents several technical advantages. For example, a valve assembly that selectively provides multiple flow paths and complies with various safety regulations for robotic milking systems. The valve assembly is configured to provide a block-bleed-block system to prevent fluid contamination in the event of a system failure. The valve assembly is configured to provide positional feedback and can be self-cleaned by actuating the valve assembly during a cleaning procedure. The valve assembly may also be easily disassembled for inspection or repair.

Certain embodiments of the present disclosure may include some, all, or none of these advantages. These advantages and other features will be more clearly understood from the following detailed description taken in conjunction with the accompanying drawings and claims.

BRIEF DESCRIPTION OF THE DRAWINGS

For a more complete understanding of this disclosure, reference is now made to the following brief description, taken in connection with the accompanying drawings and detailed description, wherein like reference numerals represent like parts.

DETAILED DESCRIPTION

Disclosed herein are various embodiment of a valve assembly comprising a reconfigurable valve. The valve is configured to use a moveable piston disposed within the bore of the valve to selectively provide flow paths between an input port and output ports of the valve. In a first configuration, the valve may be configured to provide a first flow path from an input port to a first output port via a path along a portion of an exterior of the piston within the bore of the housing. For example, in the first configuration the valve may be configured such that a fluid (e.g. raw milk) flows from the input port to the first output port around the peripheral of a portion of the piston.

In a second configuration, the valve may be configured to provide a second flow path from the input port to a second output port (e.g. a dumping port) via a path within the piston. For example, in the second configuration the valve may be configured such that a fluid (e.g. a cleaning fluid) flows from the input port to the second output port at the bottom of the valve through the piston.

The valve is also configured such that a sleeve disposed concentrically around the piston provides an atmospheric gap, vent, or bleed path between the first flow path and the second flow path. The atmospheric gap provides a flow path that allows fluid to exit the valve in the event of a seal failure. Fluid may exit the valve without contaminating other flow paths. In an embodiment, the valve may be actuated by a single-acting pneumatic cylinder. For example, the valve may be configured to use a pneumatic cylinder in conjunction with a spring to actuate the valve. Examples of actuating the valve are described in FIGS. 4 and 5.

Figure 1:
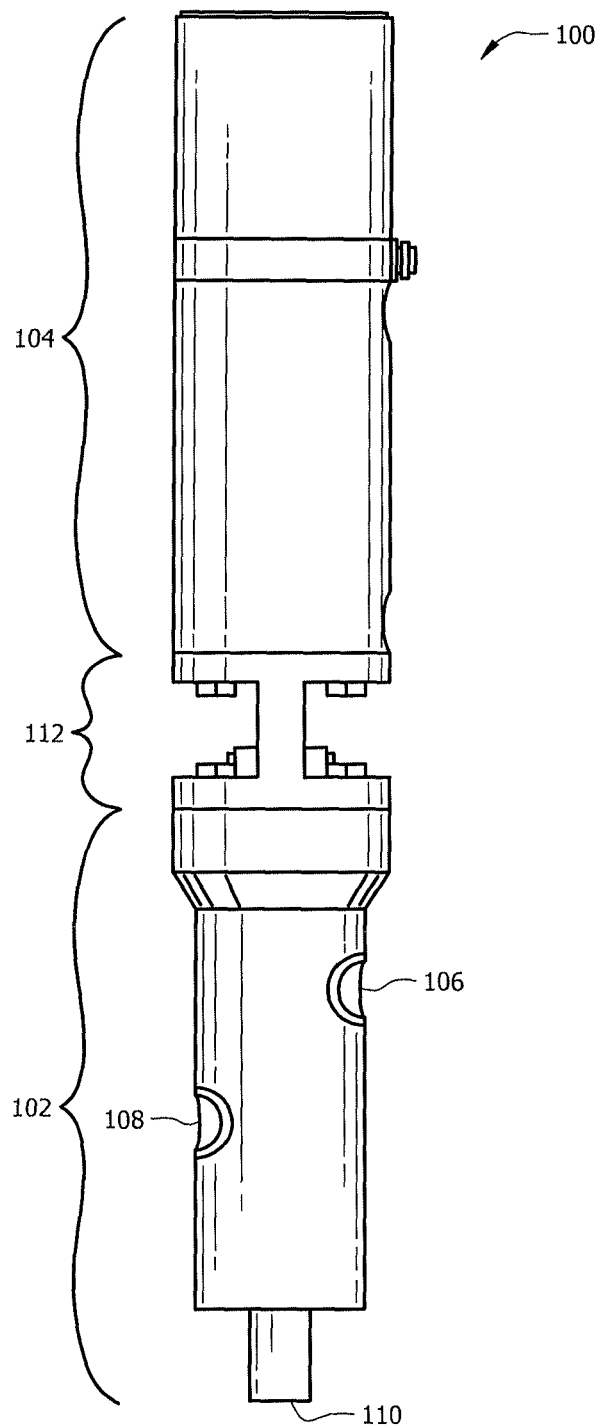
FIG. 1 is a profile view of an embodiment of a valve assembly.

FIG. 1 is a profile view of an embodiment of a valve assembly 100. The valve assembly 100 comprises a valve 102 operably coupled to an actuator assembly 104. The valve 102 comprises an input port 106, a first output port 108, and a second output port 110. The valve 102 is configured to selectively provide either a first flow path between the input port 106 and the first output port 108 or a second flow path between the input port 106 and the second output port 110. Examples of configuring the valve 102 to provide the first flow path between the input port 106 and the first output port 108 are described in FIGS. 2 and 4. Examples of configuring the valve 102 to provide the second flow path between the input port 106 and the second output port 110 are described in FIGS. 3 and 5.

The actuator assembly 104 is configured to actuate the valve 102 between a first configuration that configures the valve 102 to provide the first flow path and a second configuration that configures the valve 102 to provide the second flow path. An example of the actuator assembly 104 is described in FIGS. 4 and 5.

In an embodiment, the valve assembly 100 comprises an inspection port 112 between the valve 102 and the actuator assembly 104. The inspection port 112 is configured to allow an operator to inspect the mechanical coupling (e.g. an actuator piston) between the valve 102 and the actuator assembly 104.

Figure 2:
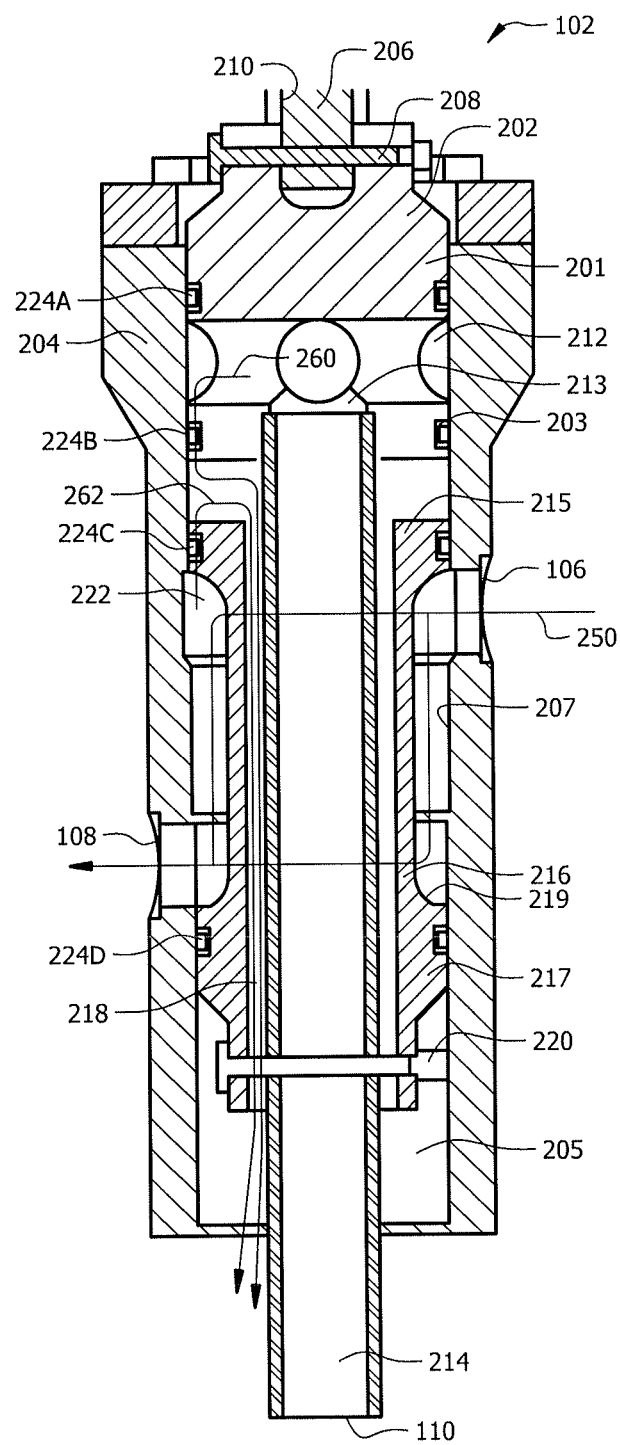
FIG. 2 is a cross-sectional view of an embodiment of a valve of the valve assembly in a first configuration.

FIG. 2 is a cross-sectional view of an embodiment of the valve 102 of the valve assembly 100 in a first configuration. The valve 102 may be referred to as being in a retracted state when the valve 102 is in the first configuration. In the first configuration, the valve 102 is configured to provide a first flow path 250 between the input port 106 and the first output port 108 of a housing 204 of the valve 102. The first flow path 250 may also be referred to as a flow-through flow path. As an example, the valve 102 may be employed in a dairy farming application and configured to provide the first flow path 250 to communicate a fluid (e.g. milk or cleaning products) between the input port 106 and the first output port 108.

The valve 102 comprises a piston 202 disposed within a bore 205 of the housing 204. The valve 102 may be configured as shown or in any other suitable configuration. The housing 204 comprises a hollow cylindrical structure. Examples of materials that form the housing 204 include, but are not limited to, metals and plastics. The housing 204 comprises an access port 210, the input port 106, and the first output port 108. The input port 106 is configured to be coupled with an inlet tube or pipe (not shown). For example, the input port 106 may be coupled with an inlet tube via one or more fittings. Similarly, the first output port 108 is configured to be coupled with an outlet tube or pipe (not shown). The access port 210 is configured to provide access for an actuating piston 206 to the piston 202. In one embodiment, the valve 102 may comprise one or more weeping holes at or proximate to the access port 210. The one or more weeping ports may be configured to allow fluid to exit or drain from the top of the valve 102, for example, in the event of a leak or when cleaning the valve 102.

The piston 202 is configured to be repositionable along the longitudinal axis of the bore 205 of the housing 204. In one embodiment, the piston 202 is configured to be positioned via an actuating piston 206 of the actuator assembly 104. The piston 202 may be operably coupled (e.g. mechanically coupled) to the actuating piston 206 using a fastener 208. An example of fastener 208 includes, but is not limited to, a removable pin. In one embodiment, the fastener 208 is removable and allows the valve 102 to be separated from the actuator assembly 104, for example, for cleaning or repairs.

The piston 202 comprises a bypass via 212 and a bypass tube 214. The bypass via 212 is disposed and positioned transversely within the bore 205 of the housing 204. The bypass via 212 is configured to provide a transverse flow path across the diameter of the housing 204. The bypass via 212 comprises an orifice 213 configured to provide a flow path from the bypass via 212 to the bore of the bypass tube 214. The bypass tube 214 is disposed and positioned longitudinally within the bore 205 of the housing 204 and comprises the second output port 110.

The piston 202 further comprises a sleeve 216 disposed concentrically around the bypass tube 214 within the bore 205 of the housing 204. The sleeve 216 has a larger inner diameter than the bypass tube 214 and is positioned such that an atmospheric gap 218 is formed between an interior surface of the sleeve 216 and an exterior surface of the bypass tube 214. In one embodiment, the sleeve 216 may be coupled to the piston 202 using a fastener 220. An example of a fastener 220 includes, but is not limited to, a removable pin. In one embodiment, the fastener 220 is removable and allows the piston 202 to be separated from the sleeve 216, for example, for cleaning or repairs. In another embodiment, the sleeve 216 may be coupled to the piston 202 using a permanent or semi-permanent bond or connection (e.g. a welded bond).

The sleeve 216 is configured such that the exterior surface of a first end 215 and a second end 217 of the sleeve 216 engages with an interior surface 207 of the housing 204. The sleeve 216 is configured such that a portion of the sleeve 216 between the first end 215 and the second end 217 has an outer diameter that is less than the outer diameter at the first end 215 and the second end 217 of the sleeve 216. An interior chamber 222 is defined by the interior surface 207 of the bore 205 of the housing 204 and the exterior surface 219 of the sleeve 216 between the first end 215 and the second end 217 of the sleeve 216. The interior chamber 222 is configured to provide a flow path around the exterior surface 219 of the sleeve 216 between the first end 215 and the second end 217. In the first configuration, the valve 102 is configured to provide the flow path 250 between the input port 106 and the first output port 108 via the interior chamber 222.

The valve 102 further comprises a plurality of seals, for example, a first seal 224A, a second seal 224B, a third seal 224C, and a fourth seal 224D. Examples of seals 224A-224D include, but are not limited to, O-rings and gaskets. Seals 224A-224D may provide a fluid-tight or substantially fluid-tight seal that prevents a route of fluid communication past the seal in a longitudinal direction of the bore 205 of the housing 204. The first seal 224A may be positioned in a groove or recess of the piston 202 at a first location 201 of the piston 202 on one side of the bypass via 212 and the second seal 224B may be positioned in groove or recess of the piston 202 at a second location 203 of the piston 202 on an opposing side of the bypass via 212. The first seal 224A and the second seal 224B are configured to provide a fluid-tight or substantially fluid-tight seal at an interface between the bypass via 212 and the bore 205 of the housing 204. The third seal 224C may be positioned in a groove or recess at the first end 215 of the sleeve 216 and the fourth seal 224D may be positioned in a groove or recess at the second end 217 of the sleeve 216. The third seal 224C and the fourth seal 224D are configured to provide a fluid-tight or substantially fluid-tight seal for the interior chamber 222.

In the first configuration, the piston 202 is configured in a first configuration or a first position within the bore 205 of the housing 204. In the first position, the piston 202 is configured such that at least a portion of the interior chamber 222 is aligned with the input port 106 and the first input port 108 and the first flow path 250 is formed between the input port 106 and the first output port 108 via the interior chamber 222. In the first position, the piston 202 is also configured such that a second flow path (not shown) via the bypass via 212 and the bypass tube 214 is obstructed.

In one embodiment, the valve 102 may be configured to isolate the first flow path 250 from a second flow path via the bypass tube 214 and the bypass via 212, for example, to prevent fluid contamination between the first flow path 250 and the second flow path. When the second seal 224B fails, the valve 102 may allow a flow path 260 past the second seal 224B that flows from the bypass via 212 to the atmospheric gap 218, and thereby exits the valve 102 without contaminating the first flow path 250. When the third seal 224C fails, fluid from the interior chamber 222 may leak along a flow path 262 past the third seal 224C into another portion of the bore 205 of the housing 204. The fluid leaking past the third seal 224C may flow from the bore 205 of the housing 204 to the atmospheric gap 218, and thereby exits the valve 102 without contaminating the second flow path. In one embodiment, the valve 102 may be configured to provide a flow path that allows fluid to exit or drain from the top of the valve 102 via one or more weeping holes when the first seal 224A fails.

Figure 3:
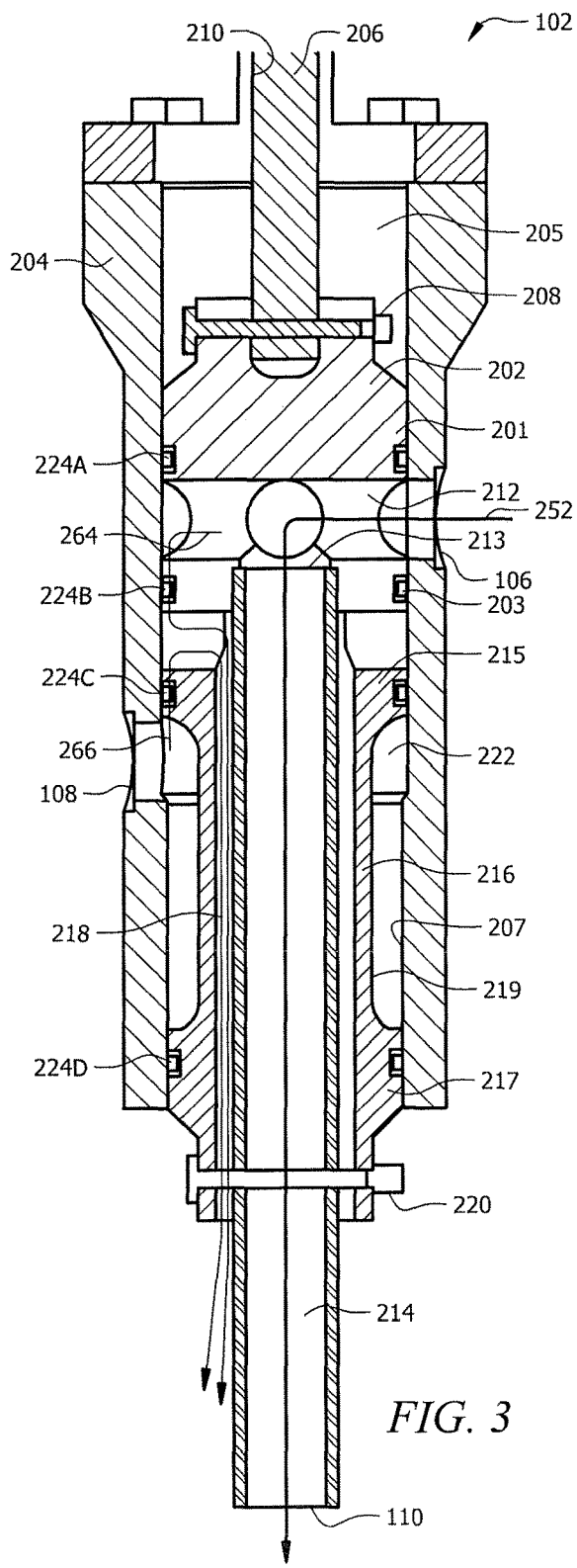
FIG. 3 is a cross-sectional view of an embodiment of the valve of the valve assembly in a second configuration.

FIG. 3 is a cross-sectional view of an embodiment of the valve 102 of the valve assembly 100 in a second configuration. The valve 102 may be referred to as being an extended state when the valve 102 is in the second configuration. In the second configuration, the valve 102 is configured to provide a second flow path 252 between the input port 106 and the second output port 110. The second flow path 252 may also be referred to as a dumping flow path. As an example, the valve 102 may be employed in a dairy farming application and configured to provide the second flow path 252 to communicate a fluid (e.g. water or cleaning products) between the input port 106 and the second output port 110. The valve 102 may be configured in the second configuration to provide the second flow path 252 for dumping fluids from the valve 102 and/or fluid lines connected to the valve 102.

In the second configuration, the piston 202 is configured in a second configuration or a second position within the bore 205 of the housing 204. In the second position, the piston 202 is configured such that the second flow path 252 is formed between the input port 106 and the second output port 110 via the bypass tube 214 and the bypass via 212. The piston 202 is positioned within the bore 205 of the housing 204 such that at least a portion of the input port 106 is aligned with the bypass via 212, thereby providing the second flow path 252 along the input port 106, the bypass via 212, the bypass tube 214, and the second output port 110.

In the second configuration, the piston 202 is also configured such that the first flow path 250 is obstructed. The sleeve 216 is positioned within the bore 205 of the housing 204 such that the interior chamber 222 no longer provides the first flow path 250 between the input port 106 and the first output port 108.

In one embodiment, the valve 102 may be configured to isolate the first flow path 250 from the second flow path 252, for example, to prevent fluid contamination between the first flow path 250 and the second flow path 252. When the second seal 224B fails, fluid from the bypass via 212 may leak along a flow path 264 past the second seal 224B into the bore 205 of the housing 204. The fluid leaking past the second seal 224B may flow from the bore 205 of the housing 204 to the atmospheric gap 218, and thereby exits the valve 102 without contaminating the first flow path 250. When the third seal 224C fails, the valve 102 may allow a flow path 266 past the third seal 224C that flows from the first output port 108 to the atmospheric gap 218, and thereby exits the valve 102 without contaminating the second flow path 252.

Figure 4:
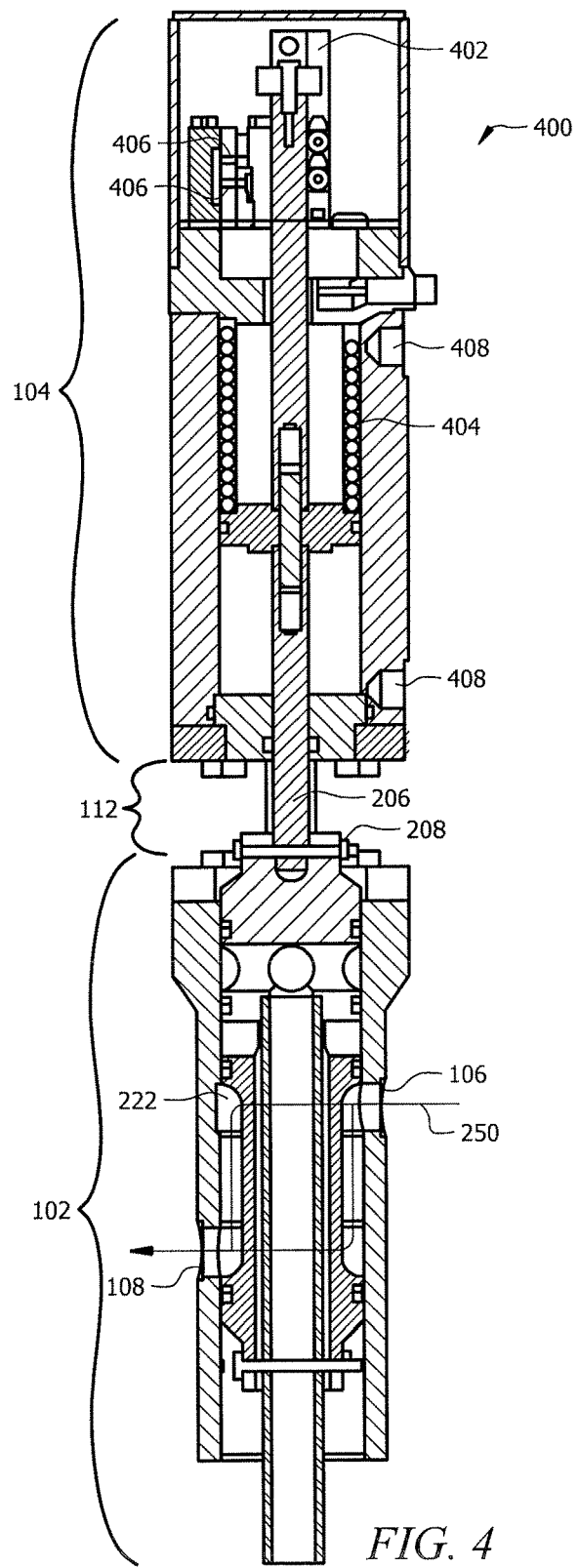
FIG. 4 is a cross-sectional view of an embodiment of the valve assembly in the first configuration.

FIG. 4 is a cross-sectional view of an embodiment of the valve assembly 100 in the first configuration 400. The valve assembly 100 may be referred to as being in a retracted state when the valve assembly 100 is in the first configuration. In the first configuration, the valve assembly 100 is configured to provide the first flow path 250 between the input port 106 and the first output port 108 via the internal chamber 222 of the valve 102.

The actuator assembly 104 comprises the actuator piston 206 configured to operably couple the actuator assembly 104 to the valve 102. The actuator assembly 104 is configured to move and position the actuating piston 206 along the longitudinal axis of the valve assembly 100 to configure the valve 102 in either the first configuration or the second configuration. In one embodiment, the actuator assembly 104 comprises an actuator 402 operably coupled to the actuator piston 206 and a spring 404 operably coupled to the actuator piston 206. The actuator assembly 104 may be configured to employ the actuator 402 to apply a pneumatic force to move or position the actuating piston 206 in a first direction along the longitudinal axis of the valve assembly 100 which configures the valve 102 in the first configuration and the spring 404 to apply a spring force to move or position the actuating piston 206 in a second direction along the longitudinal axis of the valve assembly 100 which configures the valve 102 in the second configuration. The spring 404 may also configured to return the valve 102 to a safe state (i.e. the second configuration) in the event of a system failure. For instance, during a system failure, the spring 404 may decompress and apply a force onto the actuator piston 206 to transition the valve 102 to the second configuration. Examples of a system failure include, but are not limited to, a loss of power or air pressure to the actuator assembly 104 (e.g. the actuator 402).

Alternatively, the actuator assembly 104 may be configured to employ any other suitable mechanisms and/or forces to move and position the actuator piston 206. For example, the actuator assembly 104 may employ an electronic actuator to position the actuator piston 206 in the first direction and/or the second direction. In FIG. 4, the actuator 402 positions the actuator piston 206 in a first position with respect to the longitudinal axis of the actuator assembly 104 which compress the spring 404 and configures the valve 102 in the first configuration.

The actuator assembly 104 may further comprise one or more position sensors 406. An example of a position sensor 406 includes, but is not limited to, an inductive proximity sensor. Positions sensors 406 may be employed to detect and determine the position of the actuating piston 206 with respect to the longitudinal axis of the actuator assembly 104 and the valve assembly 100. For example, positions sensors 406 may be employed to determine whether the valve assembly 100 and the valve 102 are configured in the first configuration or the second configuration.

The actuator assembly 104 may also comprise one or more breather ports 408. Breather ports 408 may be configured to provide ventilation or, to relieve internal pressure for the actuator assembly 104.

Figure 5:
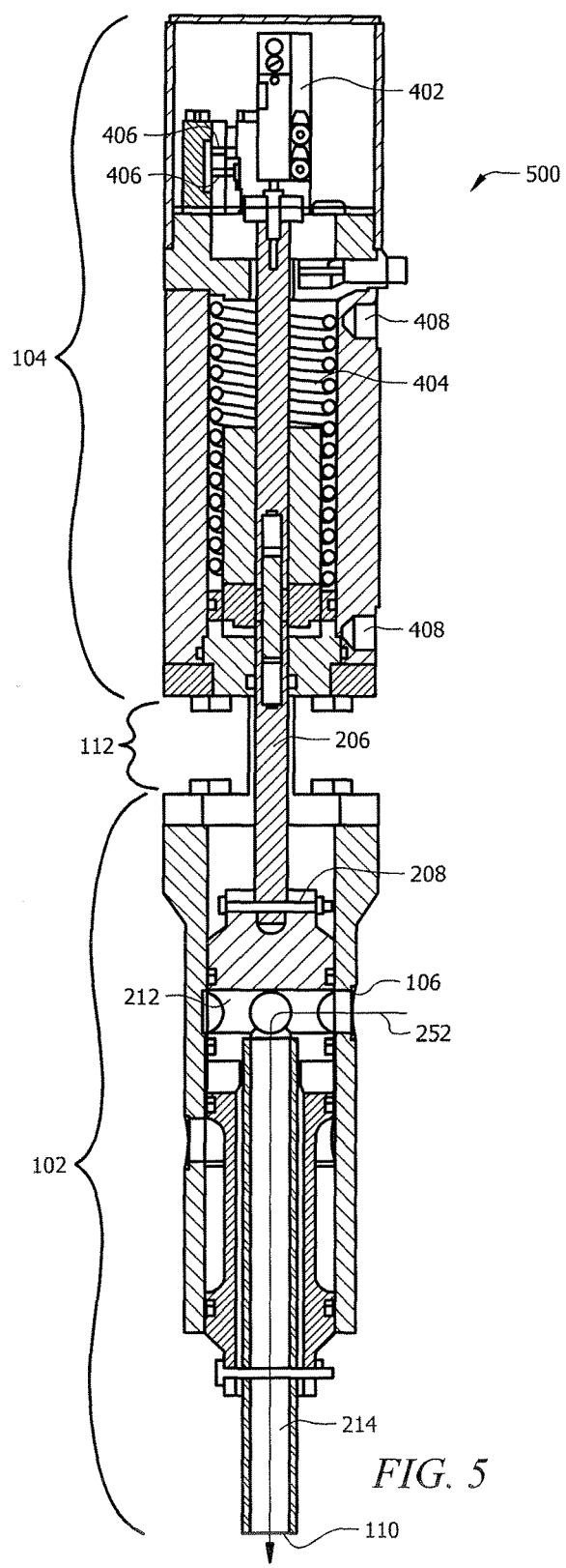
FIG. 5 is a cross-sectional view of an embodiment of the valve assembly in the second configuration.

FIG. 5 is a cross-sectional view of an embodiment of the valve assembly 100 in the second configuration 500. The valve assembly 100 may be referred to as being in an extended state when the valve assembly 100 is in the second configuration. In the second configuration, the valve assembly 100 is configured to provide the second flow path 252 between the input port 106 and the second output port 110 via the bypass tube 214 and the bypass via 212 of the valve 102. In FIG. 5, the actuator 402 positions the actuator piston 206 in a second position with respect the longitudinal axis of the actuator assembly 104 which decompress the spring 404 and configures the valve 102 in the second configuration.

Figure 6:
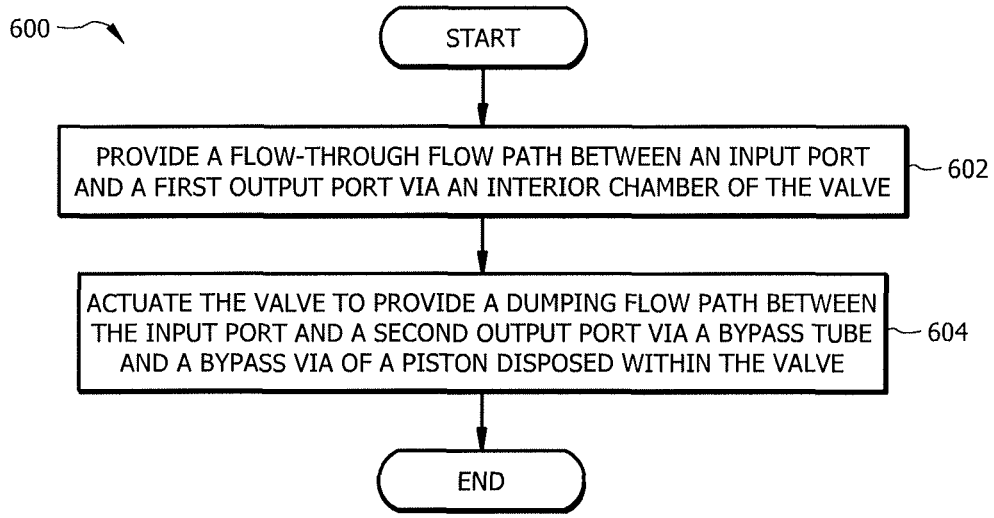
FIG. 6 is a flowchart of an embodiment of a valve actuating method for the valve of the valve assembly.

FIG. 6 is a flowchart of an embodiment of a valve actuating method 600 for the valve 102 of the valve assembly 100. The valve 102 may be initially configured in the first configuration to perform a first operation using the valve 102 and then may be transitioned to the second configuration to perform a second operation using the valve 102. For example, the valve 102 may be configured in the first configuration to communicate or transport milk via the valve 102 and then may be transitioned to the second configuration to dump residual milk and/or to clean the valve 102.

At step 602, the valve 102 is configured to provide the flow-through flow path (i.e. the first flow path 250) between the input port 106 and the first output port 108 via the interior chamber 222 of the valve 102. The valve 102 may be configured in the first configuration similarly to as described in FIGS. 2 and 4.

At step 604, the valve 102 is actuated to provide the dumping flow-path (i.e. the second flow path 252) between the input port 160 and the second output port 110 via the bypass tube 214 and the bypass via 212 of the piston 202 disposed within the valve 102. For example, the valve 102 may be configured in the second configuration similarly to as described in FIGS. 3 and 5. In an embodiment, the valve 102 may be actuated via the actuator piston 206 of the actuator assembly 104. The actuator assembly 104 may move the actuator piston 206 from a first position to a second position with respect to the longitudinal axis of the actuator assembly 104 which configures the valve 102 in the second configuration. For example, the actuator assembly 104 and the valve 102 may be configured similarly to as described in FIG. 5.

Figure 7:
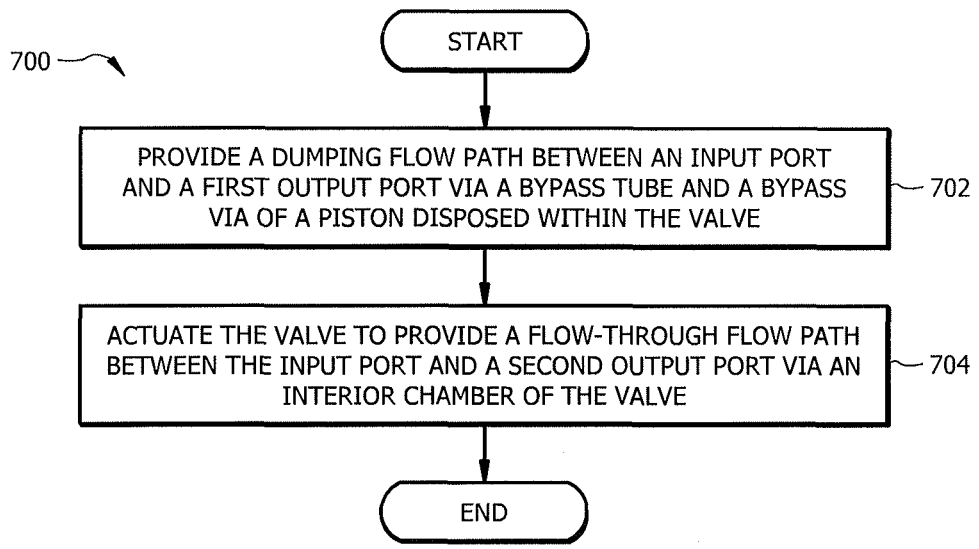
FIG. 7 is a flowchart of another embodiment of a valve actuating method for the valve of the valve assembly.

FIG. 7 is a flowchart of another embodiment of a valve actuating method 700 for the valve 102 of the valve assembly 100. The valve 102 may be initially configured in the second configuration to perform a first operation using the valve 102 and then may be transitioned to the first configuration to perform a second operation using the valve 102. For example, the valve 102 may be configured in the second configuration for a cleaning processing and then may be transitioned to the first configuration to communicate or transport milk via the valve 102.

At step 702, the valve 102 is configured to provide the dumping flow path (i.e. the second flow path 252) between the input port 106 and the second output port 110 via the bypass tube 214 and the bypass via 212 of the piston 202 disposed within the valve 102. For example, the valve 102 may be configured in the second configuration similarly to as described in FIGS. 3 and 5.

At step 704, the valve 102 is actuated to provide the flow-through flow path (i.e. the first flow path 250) between the input port 106 and the first output port 108 via the interior chamber 222 of the valve 102. For example, the valve 102 may be configured in the first configuration similarly to as described in FIGS. 2 and 4. In an embodiment, the valve 102 may be actuated via the actuator piston 206 of the actuator assembly 104. The actuator assembly 104 may move the actuator piston 206 from a second position to a first position with respect to the longitudinal axis of the actuator assembly 104 which configures the valve 102 in the first configuration. The actuator assembly 104 and the valve 102 may be configured similarly to as described in FIG. 4.

In one embodiment, the valve 102 may be cycled between the first configuration and the second configuration during a cleaning operation for the valve 102 or a system that comprises the valve 102. For example, the valve 102 may be cycled between the first configuration and the second configuration during a short clean process such as during a period between milking different cows in a dairy farming application. In another example, the valve 102 may be cycled between the first configuration and the second configuration during a full system clean, for example, to clean the valve 102 and tubes (e.g., inlet tubes and/or outlet tubes) coupled to the valve 102. The valve 102 may be configured to cycle at any suitable rate between the first configuration and the second configuration as would be appreciated by one of ordinary skill in art upon viewing this disclosure.

While several embodiments have been provided in the present disclosure, it should be understood that the disclosed systems and methods might be embodied in many other specific forms without departing from the spirit or scope of the present disclosure. The present examples are to be considered as illustrative and not restrictive, and the intention is not to be limited to the details given herein. For example, the various elements or components may be combined or integrated in another system or certain features may be omitted, or not implemented.

In addition, techniques, systems, subsystems, and methods described and illustrated in the various embodiments as discrete or separate may be combined or integrated with other systems, modules, techniques, or methods without departing from the scope of the present disclosure. Other items shown or discussed as coupled or directly coupled or communicating with each other may be indirectly coupled or communicating through some interface, device, or intermediate component whether electrically, mechanically, or otherwise. Other examples of changes, substitutions, and alterations are ascertainable by one skilled in the art and could be made without departing from the spirit and scope disclosed herein.

To aid the Patent Office, and any readers of any patent issued on this application in interpreting the claims appended hereto, applicants note that they do not intend any of the appended claims to invoke 35 U.S.C. § 112(f) as it exists on the date of filing hereof unless the words "means for" or "step for" are explicitly used in the particular claim.

The invention claimed is:

1. A system comprising:
   an actuator assembly comprising a first piston configurable between a first position and a second position; and
   a dump valve operably coupled to the actuator assembly, and comprising:
      a housing comprising:
         an input port; and
         a first output port; and
      a second piston disposed within a bore of the housing and operably coupled to the first piston, and comprising:
         a bypass via disposed transversely within the bore of the housing, wherein the bypass via comprises an opening that provides a flow path through the second piston across a diameter of the housing;
         a bypass tube disposed longitudinally within the bore of the housing, and comprising a second output port, wherein the bypass tube provides a flow path from the bypass via to the second output port;
         a sleeve disposed concentrically around the bypass tube within the bore of the housing, wherein:
            an exterior surface of the sleeve and an interior surface of the bore of the housing defines an interior chamber;
            the second piston is configurable between a first configuration when the first piston is in the first position and a second configuration when the first piston is in the second position, wherein:
               the first configuration provides a first flow path between the input port and the first output port via the interior chamber; and
               the second configuration provides a second flow path between the input port and the second output port via the bypass via and the bypass tube; and
            an atmospheric gap defined by a space between an interior surface of the sleeve and an exterior surface of the bypass tube.

2. The system of claim 1, further comprising:
   a seal positioned between the bypass via and the atmospheric gap, wherein the seal allows a flow path from the bypass via to the atmospheric gap when the seal fails.

3. The system of claim 1, further comprising:
   a seal positioned between the interior chamber and the atmospheric gap, wherein the seal allows a flow path from the interior chamber to the atmospheric gap when the seal fails.

4. The system of claim 1, wherein the second piston is configured to:
   move from the first configuration to the second configuration in response to a force applied by the first piston to the second piston in a first direction; and
   move from the second configuration to the first configuration in response to a force applied by the first piston to the second piston in a second direction.

5. The system of claim 1, wherein the first piston is configured to:
   apply a force to the second piston in a first direction using a spring operably coupled to the first piston; and
   apply a force to the second piston in a second direction using an actuator operably coupled to the first piston.

6. The system of claim 1, wherein:
   the actuator assembly comprises a spring operably coupled to the first piston;
   the spring is configured to apply a force to the first piston to transition the second piston to the second configuration in the event of a system failure.

7. An apparatus comprising:
   a housing comprising:
      an input port; and
      a first output port; and
   a piston disposed within a bore of the housing, and comprising:
      a bypass via disposed transversely within the bore of the housing, wherein the bypass via comprises an opening that provides a flow path through the piston across a diameter of the housing;
      a bypass tube disposed longitudinally within the bore of the housing, and comprising a second output port, wherein the bypass tube provides a flow path from the bypass via to the second output port; and
      a sleeve disposed concentrically around the bypass tube within the bore of the housing, wherein:
         an exterior surface of the sleeve and an interior surface of the bore of the housing defines an interior chamber, and
         the piston is configurable between a first configuration and a second configuration, wherein:
            the first configuration provides a first flow path between the input port and the first output port via the interior chamber; and
            the second configuration provides a second flow path between the input port and the second output port via the bypass via and the bypass tube; and an atmospheric gap defined by a space between an interior surface of the sleeve and an exterior surface of the bypass tube.

8. The apparatus of claim 7, further comprising:
a seal positioned between the bypass via and the atmospheric gap, wherein the seal allows a flow path from the bypass via to the atmospheric gap when the seal fails.

9. The apparatus of claim 7, further comprising:
a seal positioned between the interior chamber and the atmospheric gap, wherein the seal allows a flow path from the interior chamber to the atmospheric gap when the seal fails.

10. The apparatus of claim 7, wherein the piston is configured to:
move from the first configuration to the second configuration in response to a force applied to the piston in a first direction; and
move from the second configuration to the first configuration in response to a force applied to the piston in a second direction.

11. The apparatus of claim 7, wherein:
the piston is coupled to an actuator piston; and
the actuator piston is configured to move the piston longitudinally within the bore of the housing.

12. A method comprising:
providing a flow-through flow path between an input port and a first output port via an interior chamber of a valve, wherein the interior chamber is defined by an exterior surface of a sleeve disposed concentrically within a bore of the valve and an interior surface of the bore of the valve;
actuating the valve to provide a dumping flow path between the input port and a second output port via a bypass tube and a bypass via of a piston disposed within the valve, wherein:
the bypass tube is disposed longitudinally within the bore of the valve;
the bypass via is disposed transversely within the bore of the valve, wherein the bypass via comprises an opening that provides a flow path through the piston across a diameter of a housing; and
actuating the valve obstructs the flow-through flow path; and
providing an atmospheric gap defined by a space between an interior surface of the sleeve and an exterior surface of the bypass tube.

13. The method of claim 12, wherein actuating the valve comprises applying a force to the piston to move the piston from a first position to a second position within the bore of the housing.

14. The method of claim 12, wherein actuating the valve comprises using an actuator piston to move the piston longitudinally within the bore of the housing.

15. A method comprising:
providing a dumping flow path between an input port and a second output port via a bypass via and a bypass tube of a piston disposed within a valve, wherein:
the bypass tube is disposed longitudinally within a bore of the valve; and
the bypass via is disposed transversely within the bore of the valves wherein the bypass via comprises an opening that provides a flow path through the piston across a diameter of a housing; and
actuating the valve to provide a flow-through flow path between the input port and a first output port via an interior chamber of the valve, wherein:
the interior chamber is defined by an exterior surface of a sleeve disposed concentrically within the bore of the valve and an interior surface of the bore of the valve; and
actuating the valve obstructs the dumping flow path; and
providing an atmospheric gap defined by a space between an interior surface of the sleeve and an exterior surface of the bypass tube.

16. The method of claim 15, wherein actuating the valve comprises applying a force to the piston to move the piston from a first position to a second position within the bore of the housing.

17. The method of claim 15, wherein actuating the valve comprises applying a spring force to the piston to move the piston from a first position to a second position within the bore of the housing.

18. The method of claim 15, wherein actuating the valve comprises using an actuator piston to move the piston longitudinally within the bore of the housing.

* * * * *